June 29, 1965 S. A. WOLFE 3,191,378
POWER PLANTS
Filed Jan. 5, 1962 2 Sheets-Sheet 1
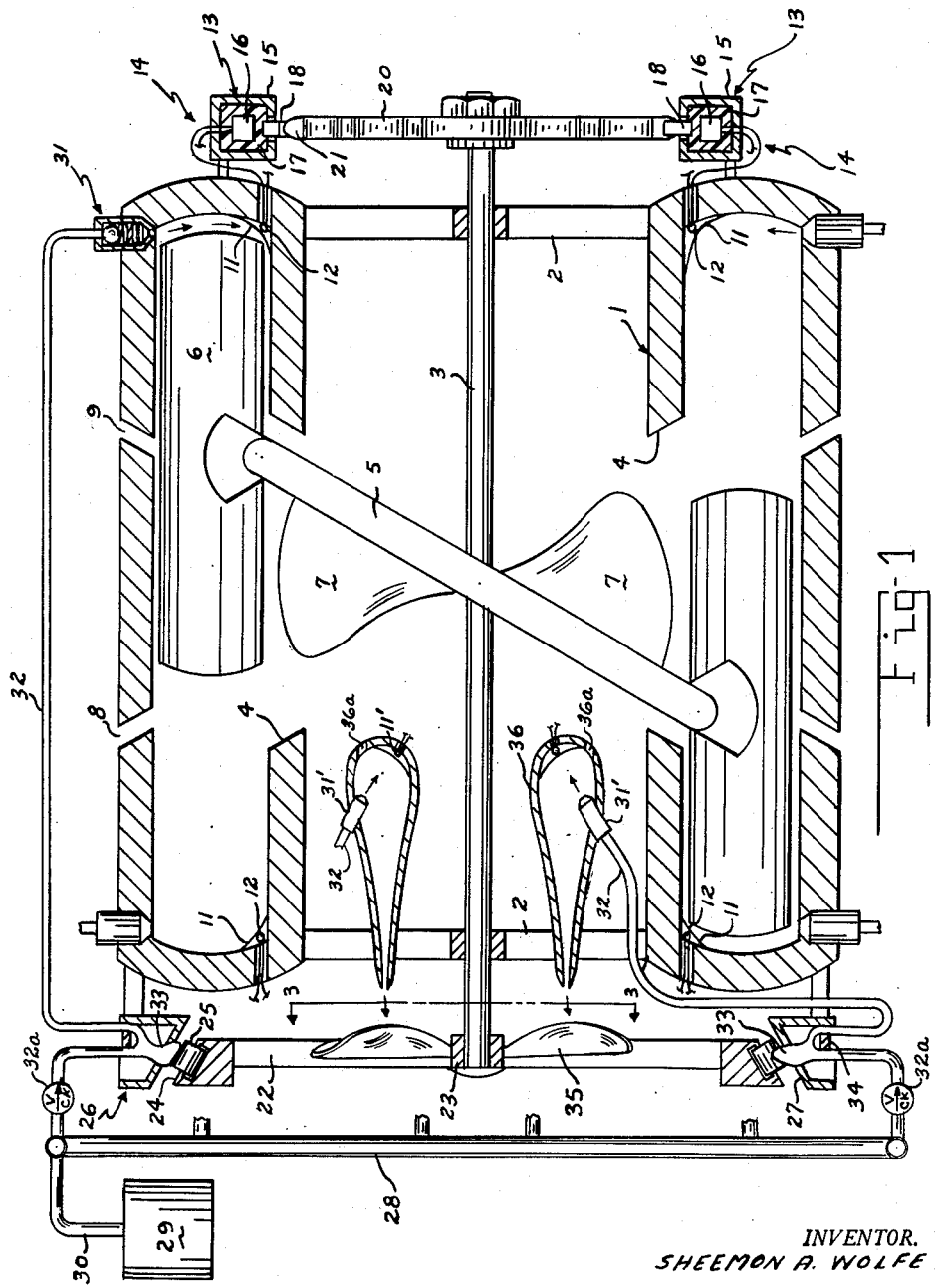
INVENTOR.
SHEEMON A. WOLFE
BY
Jerome P. Bloom
HIS ATTORNEY

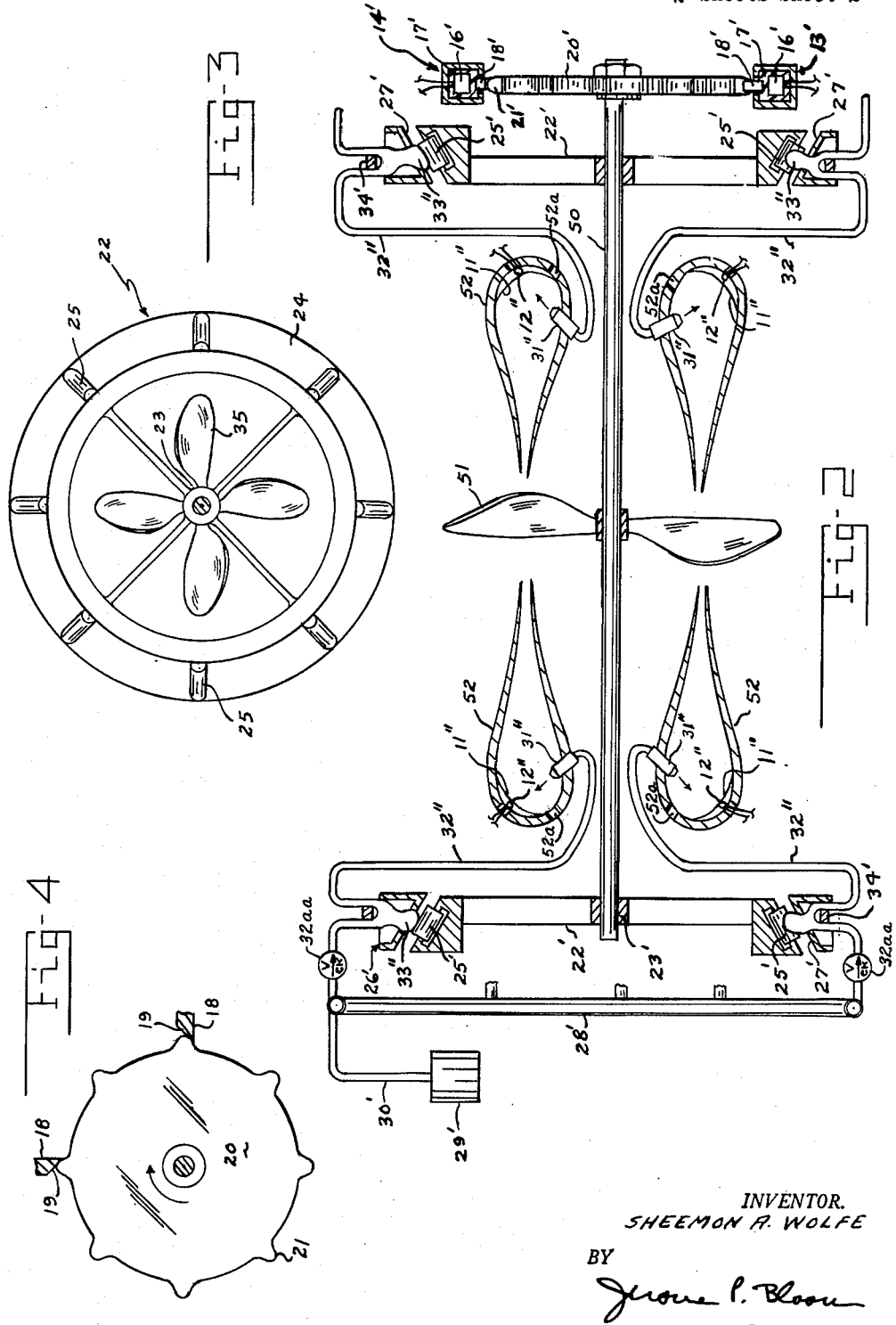

United States Patent Office 3,191,378
Patented June 29, 1965

3,191,378
POWER PLANTS
Sheemon A. Wolfe, 2422 Salem Ave., Dayton, Ohio
Filed Jan. 5, 1962, Ser. No. 164,511
8 Claims. (Cl. 60—24)

This invention relates to power plants of an improved character. Its embodiments are of simplified construction, incorporate particularly novel fuel supply and ignition systems and are designed to produce optimum efficiency in use. The fuel supply system is devoid of complexity and the ignition system functions therewith in a manner to minimize maintenance and malfunction problems prevalent in the operation of conventional power plants.

A significant aspect of the invention is that it provides a power plant or engine capable of utilizing a wide range of mediums for furnishing its motive power. This is in contrast to the power plants of the prior art which are generally adapted for use, in each instance, with a single type of fuel or other source of motive power.

A primary object of the invention is to provide improvements in power plants rendering them simpler and more economical to fabricate, more efficient and satisfactory in use, adaptable to a wide variety of applications and unlikely to malfunction.

A further object of the invention is to provide a power plant having a novel fuel and ignition system.

Another object of the invention is to provide a novel fuel supply system for engines and the like.

An additional object of the invention is to provide a power plant capable of operating equally as well with widely different mediums furnishing its motive power.

A further object of the invention is to provide improvements in power plants equally applicable to internal combustion engines and turbines.

Another object of the invention is to provide a multi-fuel power plant.

Another object of the invention is to provide a more efficient turbine.

An additional object of the invention is to provide a durable constant speed engine.

Another object of the invention is to provide power plants and fuel supply and ignition systems therefor possessing the advantageous structural features, the inherent meritorious characteristics and the means and mode of operation herein described.

With the above and other incidental objects in view which will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings, wherein preferred but not necessarily the only forms of embodiment of the invention are shown, FIG. 1 is a generally schematic cross-sectional view of a power plant in accordance with the invention;

FIG. 2 is a schematic cross-sectional view taken on line 2—2 of FIG. 1;

FIG. 3 is a schematic cross-sectional view taken on line 3—3 of FIG. 1; and

FIG. 4 is a schematic cross-sectional view of a turbine as provided by the present invention.

Like parts are indicated by similar characters of reference throughout the several views.

FIGS. 1–3 of the drawing illustrate a power plant in accordance with the invention wherein only sufficient structural detail is set forth as is necessary to disclose the improvements embodied therein. The body of the engine illustrated is proposed to include four tubular barrels 1 rectangularly arranged to be coextensively parallel. The barrels 1 are inter-connected at their respective extremities by spiders 2. The spiders 2 have axially aligned apertures defined by hub portions which bearingly support a drive shaft 3.

The innermost side portion of each barrel 1 has an identically positioned elongated aperture 4 intermediate its extremities, the respective ends of which are provided by inwardly divergent surface portions of the barrel. The apertures 4 are thereby positioned in circumferential alignment. A wobble disc 5 is fixed for rotation with the shaft 3, positioned intermediate the spiders 2. The disc 5 is inclined to the longitudinal axis of the shaft 3 and so shaped and oriented that its peripheral portion extends into the barrels 1 through the apertures 4 to a slight degree. Floatingly disposed within each of the respective barrels 1 is a piston 6 having an elongated generally cylindrical configuration. Each piston 6 is so formed and dimensioned to provide it with a relatively sloppy bearing relation to the inner wall of the barrel within which it is contained and has a single relatively arcuate recess centrally thereof opposite the aperture 4 which bearingly accommodates a peripheral portion of the disc 5.

The disc 5 has scavenging blades 7 projected from opposite faces for purposes to be further described.

Each barrel 1 is provided with air inlet and exhaust apertures 8 and 9 in its outermost wall portion positioned opposite and respectively adjacent either end of its aperture 4. A quarter moon-shaped ceramic insert 11 is integrated in each end of the barrels 1. The insert 11 has a through aperture in either end of which is positioned an electrode 12. Leads extend from the electrodes 12 in the barrels 1 to connect in electrical parallel to energizing units 13 on a frame 14 fixed adjacent one end of the barrels. The inserts 11 so provided serve as igniters or vaporizers in a manner to be further described.

Frame 14 has an annular configuration and the units 13 are radially oriented thereon in a plane perpendicular to the shaft 3 which provides their center. Each unit 13, in a preferred form, consists of a tubular metal jacket 15 closed to its outermost end and open to its innermost end and nesting a bar-shaped piezo-electric crystal in a bed of plastisol 17 which fills its interior. The piezo-electric crystals 16 are the mediums to which the leads from the electrodes 12 connect in electrical parallel. A metal wedge 18 radially projects from the innermost end of each jacket 15, its inner end nesting in the plastisol bed 17, in spaced, aligned relation to the crsytal 16 therein. This provides a circumferentially spaced series of radially oriented wedges 18 projected inwardly of the frame 14 toward its center. The leading surfaces 19 of the wedges 18, in a circular sense, are similarly sloped to advance inwardly to the shaft 3. A disc 20 is fixed to project perpendicular to the shaft 3 in a plane common to that of the wedges 18. Rounded cam-like projections 21 are provided in circumferentially spaced relation on the outer periphery of the disc 20. The surfaces 19 on the wedges 18 are arranged to lie in the path of the projections 21 to be struck thereby on rotation of the shaft 3. Thus, on rotation of the shaft 3, the wedges 18 will be successively driven inwardly of their jackets 15 on impact of the projections 21 of the disc 20. The shock of impact is transmitted directly through the intervening plastisol to the crystals 16. This shock is sufficient to energize the crystals to produce a flow of current in the connected leads extending to the electrodes 12 which in turn produces a substantially continuous spark across the electrodes in each insert 11. For the above described reasons, as long as there is a rotation of the shaft 3, the electrodes 12 in each insert 11 will produce a spark which is continuous and sufficient to produce a heat level of the insert body adequate to produce ignition or vaporization of the medium which may be utilized therewith to furnish motive power.

A wheel shaped frame 22 is fixed by its hub 23 to the shaft 3 in a plane parallel to that of the frame 14 and to the end of the barrels 1 remote therefrom. The outer peripheral surface 24 of the frame 22 is conically convergent in the direction of the barrels and includes circumferentially spaced recesses which partially nest rollers 25 which project therefrom. The rollers 25 rotatably mount on pins which similarly bridge these recesses.

Fixed concentric with the frame 22 is a ring shaped casing 26. The inner peripheral surface 27 of this casing is conically convergent and lies in spaced parallel relation to the surface 24 on the frame 22. The casing 26 may be suitably fixed to the frame structure of the power plant including the barrels 1. This casing is in the form of a shell open at its outer periphery and including circumferentially spaced apertures in its surface 27 directly opposite the rollers 25 projected from the frame 22.

Suitably fixed to casing 26 is a header ring 28. Ring 28 is schematically shown to receive fuel from a supply source 29 through a conduit 30. Each barrel 1 has a conventional one way valve unit 31 in each end, opening to its interior adjacent an igniter 11. A series of delivery lines 32 extend from the ring 28 and through the casing 26 to respectively connect to one of the valve units 31. The lines 32 are provided with fuel under pressure from the source 29, the pressure being of sufficient magnitude to maintain the lines filled to the valve units 31 but insufficient to pass the fuel through the valve units. The lines 32 have bulb-like expansions 33 providing pockets of fuel at their sections within the casing 26 which respectively project through one of the apertures in its surface 27. The lines 32 are resilient and preferably fabricated of a plastic such as Teflon. A band 34 extends peripherally of the casing 26 to confine the lines 32 therein in a manner to maintain a predetermined projection of the bulb portions 33 from the surface 27. Band 34 may be of any suitable nature enabling its adjustment to variably confine lines 32 to casing 26 whereby to produce a selective degree of projection of the bulb portions 33 from the surface 27 and in the path of the rollers 25 on the frame 22. It may be seen that on the rotation of shaft 3, and frame 22 therewith, the rollers 25 will engage and compress the bulb portions 33 in a particular sequence, dependent on their relative spacing. This relative spacing may obviously be established to suit the particular application.

The compression of a bulb-like portion 33 will effect a pulsing of the pocket or charge of fuel therein through the line 32 and associated valve unit 31 to enter one of the barrels 1 adjacent an igniter 11. It should be obvious that the degree of projection of the bulbs 33 will determine the size of the charges pulsed. The arrangement of the bulbs 33 and the rollers 25 in the embodiment illustrated is to produce a timed sequence of fuel compression and ignition to either end of the barrels 1 as will become obvious. Interposed in each delivery line 32, between the header ring 28 and a respective bulb 33, is a check valve 32a or the like precluding reverse flow toward reservoir 29 when the bulb is compressed.

A series of impeller blades 35 are fixed to radially project from the hub 23 of the frame 22. Fixed within the framework of the power plant defined by the barrels 1 and spiders 2 are a plurality of ram jet combustion chambers 36 the discharge of which is directed at the blades 35. Fixed interiorly of each chamber 36 is an igniter 11' as above described having the leads therefrom operatively connected to the energizing units 13 to be maintained constantly energized and at an operating heat level in the manner of the other igniters. Chambers 36 also include valve units 31' as provided in the barrels 1. Fuel delivery lines 32 from the ring 28 also extend to the valve units 31' of the chambers 36 and incorporate similar check valves 32a. The ram jet chambers 36 have means in connection therewith for bringing air to the chambers to mix with fuel delivered through valve units 31', as indicated for example by the openings 36a.

The lines 32 to the chambers 36 have their bulb-like portions 33 projected from the surface 27 intermediately of those directed to the barrels 1. The spacing of the portions 33 is such that delivery of fuel to the chambers 36 provide firing therein to produce a discharge to drive blades 35 and thereby shaft 3 intermediately of the firing in the barrels 1.

The invention embodiment thus described produces a unique and efficient power plant having a novel fuel supply and ignition system. While it is described to handle a combustible fuel, it should be obvious the elements 11 and 11' can be conditioned to receive a medium which can be vaporized to furnish the motive power to operate the power plant above described. Its operation with a combustible fuel is as follows:

The operation of the power plant can be initiated employing a conventional starter connected in any suitable manner to commence the drive of shaft 3. As the shaft 3 starts to rotate, the drive of the disc 20 thereon produces a substantially instantaneous heating of all the igniters 11 and 11' which are connected in the electrical parallel to the energizing units 13. The heating of the igniters reaches an immediate operative level as the cam elements 21 produce a continuing impact on the wedges 18 in the manner previously described. The heat level of the igniters is obviously continuously maintained as long as the shaft 3 rotates. Simultaneously, the rollers 25 on the frame 22 operate to sequentially compress the bulb portions 33 of lines 32 to pulse charges of fuel to the barrels 1 and chambers 36 in a predetermined order. As the shaft 3 commences to rotate, it simultaneously starts a reciprocation of the pistons 6 in a predetermined sequence through the medium of the disc 5 in bearing relation thereto. Noting FIG. 1 of the drawings, as a piston 6 in a barrel 1 is being moved to a compression position, a roller 25 will pulse a charge through a valve 31 in advance of the piston for compression thereby. The heat level of the adjacent igniter is such that there will be instantaneous ignition at a predetermined point of compression to drive the piston oppositely. The drive of the piston, as firing occurs, in turn drives the shaft 3 due to its bearing relation to the disc 5 and causes movement of the other pistons thereby. Referring again to FIG. 1 of the drawings, as the piston 6 is driven beyond an aperture 9, for example, the opening 4 comes in communication therewith and the blades 7 on the disc 5, dependent on their configuration, will drive or pull air through or from the barrel 1 to produce a scavenging of the barrel thereby. Air is provided in a similar manner for further combustion activity within the barrels in a manner believed obvious. Thus, as long as the drive of the shaft 3 is initiated, the power plant becomes self energized to automatically continue to operate until the fuel supply is cut off or the shaft 3 suitably braked. As previously mentioned, firing will automatically occur in a similar manner in chambers 36 intermediately of the firing of the barrels 1 so as to provide a complementary and reinforcing drive of shaft 3 whereby to produce a maximum possible power output in simple effective fashion. It should be recognized that the fixed positioning of the bulb portions 33 relative the rollers 25 will result in a uniform quantity of fuel being delivered to each barrel or chamber 36. This results in a constant speed engine.

Thus, a significant output will be developed in the power plant above described which may be suitably transmitted to satisfy the intended application. A very simple yet positive timed delivery of fuel is enabled thereby, insuring a powered drive of the shaft 3 which offers maximum efficiency in operation. The obvious simplicity of the fuel and ignition system is such to substantially eliminate any problems with respect to maintenance or malfunction. Further, the constant maintenance of the temperature of the igniter as provided herein enables an instantaneous firing procedure at the optimum instant.

It is to be noted that obviously rather than adjusting the band 34 containing the bulb portions 33 in projected relation from the casing 26, suitable means may be provided to adjust the frame 22 axially of the shaft 3 to accomplish a change in the charge of fuel being pulsed to the various barrels or combustion chambers.

A further embodiment of the invention may be observed with reference to FIG. 2 of the drawings. This provides a schematic illustration of a turbine and contemplates use of a medium for furnishing motive power which would be vaporized rather than ignited. As shown, a drive shaft 50 mounts an impeller 51. Schematically shown to either side of the impeller 51 are opposed ram jet units including chambers 52, which have means to admit air for combustion, as represented by openings 52a. Incorporated in the chambers 52 are igniter units 11" identical with the igniters 11' and similarly energized. As in the first described embodiment, the drive shaft mounts a disc 20' including cam-like projections 21'.

A circular frame 14' fixed concentric with the disc 20' mounts radially oriented energizing units 13'. The units 13' are identical to the units 13 and connected in electrical parallel with the electrodes 12" of the igniters 11". As in the case of the embodiment first described, drive of the shaft 50 causes impact of the projections 21' on the wedges 18' of the energizing units, inducing an immediate and continuous spark across the electrodes in each igniter. This raises the temperature of each igniter to a level at which it is operative to vaporize whatever medium may be used to furnish motive power for the impeller 51.

Referring to FIG. 2 of the drawings, the medium for furnishing motive power is directed from a source of supply 29' through separate conduits 30' to separate header rings 28'. The chambers 52 to opposite sides of impeller 51 connect to separate header rings 28' by means of delivery lines 32". Only one header ring is shown since the manner of its duplication appears obvious. Valve units 31" provide for introduction of the medium to the chambers 52 in the area of their igniters 11". The lines 32" to the chambers 52 to respectively opposite sides of the impeller are respectively confined to fixed casings 26' concentric with frames 22' fixed for rotation with the shaft 50. As in the embodiment first described, the lines 32" include bulb-like expansions 33" projected from the casings 26' in the path of rollers 25' projected from the frames 22'. They additionally include check valves 32aa interposed in advance of bulbs 33" and serving the same purpose as valves 32a of the first considered embodiment. Since the details and function of the fuel supply system in this embodiment of the invention is essentially a duplicate of that provided in the embodiment first described, exhaustive repetition thereof appears to be unnecessary. The difference in this embodiment is that suitable controls of a conventional nature may be provided to selectively interrupt the delivery of the medium for furnishing motive power to the chambers to either side of the impeller 51. The reasons become obvious from a description of the operation of this embodiment of the invention which follows.

Controls provided are initially established so that delivery of the medium for furnishing motive power is interrupted with reference to the chambers 52 to one side of the impeller 51. The shaft 50 is then energized by means of a conventional starter. As the shaft 50 rotates, the rollers 25' projected from one frame 22' pulse charges of the medium contained in the adjacent bulb-like portions 33" of the delivery lines 32" to the associated chambers 52 in a predetermined sequence. Immediately as the charges enter the chambers 52, they are vaporized by contact with the igniters 11". The expansion of the medium produces jet discharge from the respective chambers 52 to drive the impeller 51 by impingement on the blades thereof. Since only the chambers to the one side of the impeller are operative, the impeller and thereby the shaft 50 will be constantly driven in one direction. The output and the efficiency of the system thus provided is optimum. When it is desired to brake the drive of the shaft 50, the controls may be operated to deliver medium for furnishing motive power to the chambers 52 to the opposite side of the impeller 51. It may be seen that the operation of the chambers 52 at the opposite side of the impeller will produce jets braking the effect of the driving jets. Similarly, the controls may be operated in an obvious manner to drive the shaft 50 in a direction opposite to that initially provided.

This second embodiment of the invention is quite simple and highly versatile. It retains all the advantages of the fuel supply and ignition system of the embodiment first described and produces a power plant which is the ultimate in simplicity.

It is believed the fact that the power plant of the invention may employ any number of mediums for furnishing its motive power has been clearly established. While the invention has been illustrated in limited form and application other forms and applications are contemplated thereby and are within the capacity of those versed in the art.

From the above description it will be apparent that there is thus provided a device of the character described possessing the particular features of advantage before enumerated as desirable, but which obviously is susceptible of modification in form, proportion, detail of construction and arrangement of parts without departing from the principles involved or sacrificing any of their advantages.

While in order to comply with the statute, the invention has been described in language more or less specific as to structural features, it is to be understood the invention is not limited to the specific features shown but that the means and construction herein disclosed merely comprise modes by way of example of putting the invention into effect.

Having thus described my invention, I claim:

1. A power plant including, a drive shaft, a plurality of cylinders, igniter means in each of said cylinders, piston means reciprocable in each of said cylinders having means connecting them for conjoint operation with said shaft, means for delivering fuel to each cylinder for compression by the piston therein and means operatively connected to said shaft responsive to drive thereof to maintain a predetermined heat level in said igniter means rendering it constantly operable to provide automatic ignition of the fuel on a predetermined compression thereof and contact therewith, said means including energizable crystal means and means for delivering impact shocks to said crystal means from said shaft.

2. A power plant comprising, power transmission means including a drive shaft, means defining a plurality of chambers having heater means therein, impact operated control means for said heater means, means in connection with each of said chambers for a selectively pulsing a charge of fuel thereto, means in connection with said drive shaft for operation simultaneously therewith in a manner to produce an impact on said control means whereby to maintain said heater means at a substantially constant heat level which is sufficient to produce a substantially instantaneous expansion of a charge of fuel on entering any one of said chambers and means in each of said chambers operatively connected with said transmission means through said drive shaft operable in response to the expansion of a charge of fuel in the associated chamber to drive said shaft and said transmission means thereby.

3. A power plant comprising, transmission means including a drive shaft, means defining a plurality of chambers thereabout having heater means therein, impact operated control means for said heater means, means in connection with each of said chambers for selectively pulsing a charge of fuel thereto, piston means in each of said chambers, means connecting said drive shaft with each of said piston means having air impeller means thereon for scavenging said chambers and means connected for operation with said drive shaft operable thereby to produce an impact on said control means in a manner to maintain said heater means at a heat level sufficient to produce a substantially instantaneous expansion of a charge of fuel entering a chamber, upon a predetermined compression thereof by the piston therein, as a result of which the said piston is rendered operable to drive said shaft and said transmission means thereby.

4. A power plant as set forth in claim 3 characterized by additional impeller means on said drive shaft and means defining at least one additional combustion chamber the discharge of which is directed against said impeller means to afford a supplemental drive of said drive shaft and said transmission means thereby.

5. An engine comprising at least one cylinder having reciprocable therein a piston and means in connection therewith for delivering a charge of a medium for producing motive power in advance of said piston as it moves to a point of compression, said engine being characterized by means in said cylinder operative to produce an expansion of said medium on a predetermined compression thereof whereby to drive said piston, said expansion producing means comprising a heat conductive element in said cylinder and power transmission means in connection with said piston for drive thereby having means in connection therewith operative to produce heat whereby to continuously maintain said expansion producing means in an operative condition, said last mentioned means including energizable crystal means and means for delivering impact shocks to said crystal means from said shaft.

6. An engine as set forth in claim 5 wherein said power transmission means includes a drive shaft connected for movement with said piston, said drive shaft having means thereon and operating therewith to induce air to move to and from said cylinder during the movement of said piston.

7. An engine as set forth in claim 6 wherein the means for producing heat in said heat conductive element includes impact operated control means, spaced electrodes engaged in said element and connected in electrical parallel to said impact operated control means and said control means being operative to produce a continuous sparking across the electrodes as long as said power transmission means continues to operate.

8. An engine including a drive shaft, internal combustion means comprising a plurality of piston and cylinder combinations conjointly connected to said drive shaft, means for supplying a combustion mixture to each of said internal combustion means, means for igniting said mixtures comprising certain crystal means and a wedge device for transmitting impact shocks thereto, said means for delivering said shocks comprising a disc fixed to said drive shaft, said disc having cam-like peripheral projections thereon to strike said wedges.

References Cited by the Examiner
UNITED STATES PATENTS

| | | | |
|---|---|---|---|
| 1,043,768 | 11/12 | Holzwarth | 60—39.01 |
| 1,935,171 | 11/33 | Woolson | 123—145 |
| 2,403,282 | 7/46 | Holmes | 123—58 |
| 2,449,022 | 9/48 | Stalker | 60—35.6 |
| 2,464,228 | 3/49 | Hall | 123—58 |
| 2,469,439 | 5/49 | Lundquist | 60—39.01 |
| 2,530,649 | 11/50 | Carey | 158—36.4 |
| 2,581,275 | 1/52 | Mock | 158—36.4 |
| 2,652,685 | 9/53 | Willgoos | 60—11 |
| 2,717,916 | 9/55 | Harkness | 123—148 |
| 3,009,975 | 11/61 | Hufferd et al. | 123—148 |
| 3,019,738 | 2/62 | Zubaty | 103—150 |

JULIUS E. WEST, *Primary Examiner.*
ROBERT R. BUNEVICH, *Examiner.*